United States Patent [19]
Olsen

[11] Patent Number: 4,781,830
[45] Date of Patent: Nov. 1, 1988

[54] CROSS FLOW FILTRATION APPARATUS AND CLOSURE ASSEMBLY THEREFOR

[75] Inventor: Douglas L. Olsen, Eden Prairie, Minn.

[73] Assignee: Osmonics, Inc., Minnetonka, Minn.

[21] Appl. No.: 183,587

[22] Filed: Apr. 19, 1988

[51] Int. Cl.$^4$ .............................................. B01D 13/00
[52] U.S. Cl. ................................ 210/232; 210/321.83; 210/450
[58] Field of Search .............. 210/232, 321, 83, 494.1, 210/450

[56] References Cited

U.S. PATENT DOCUMENTS 4,600,512  7/1986  Ald .................................. 210/321.83
4,645,601  2/1987  Regunathan .................... 210/321.83

Primary Examiner—Frank Spear
Attorney, Agent, or Firm—Dorsey & Whitney

[57] ABSTRACT

A cross flow filtration apparatus of the type having an elongated filtration element housing, a cross flow filtration element disposed therein and a closure assembly connected with the ends of the housing. The closure assembly includes a generally annular adaptor having a first end connected with the housing and a second end provided with first connection members and an end cap for sealing cooperation with the adaptor which includes an end wall having an outer peripheral edge provided with second connection members for engagement with the first connection members of the adaptor. The first and second connection members cooperate with one another so that the end cap can be selectively secured to the adaptor as a result of rotation of the end cap relative to the adaptor and a seal member is disposed between a portion of the end cap and a portion of the adaptor.

17 Claims, 2 Drawing Sheets

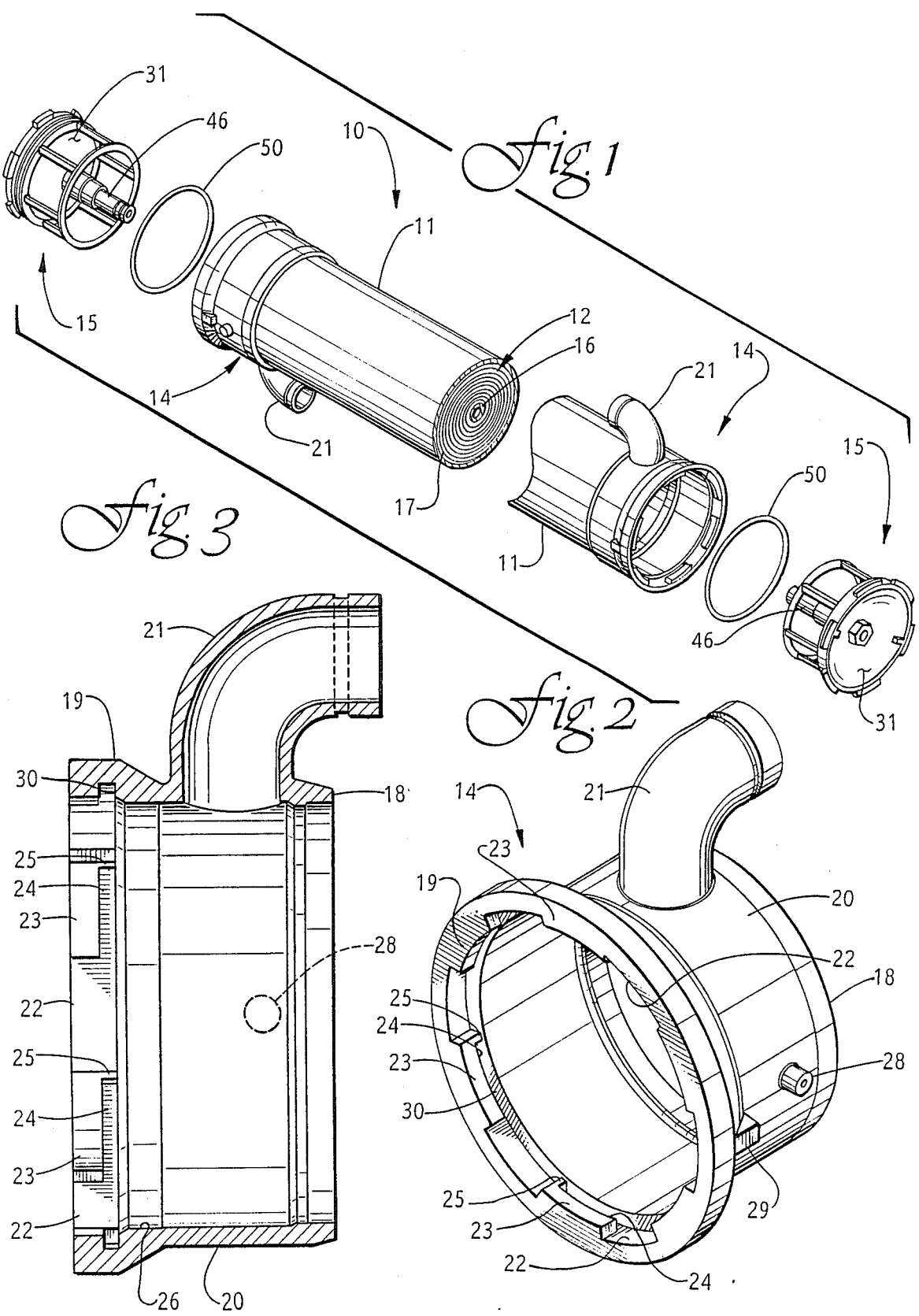

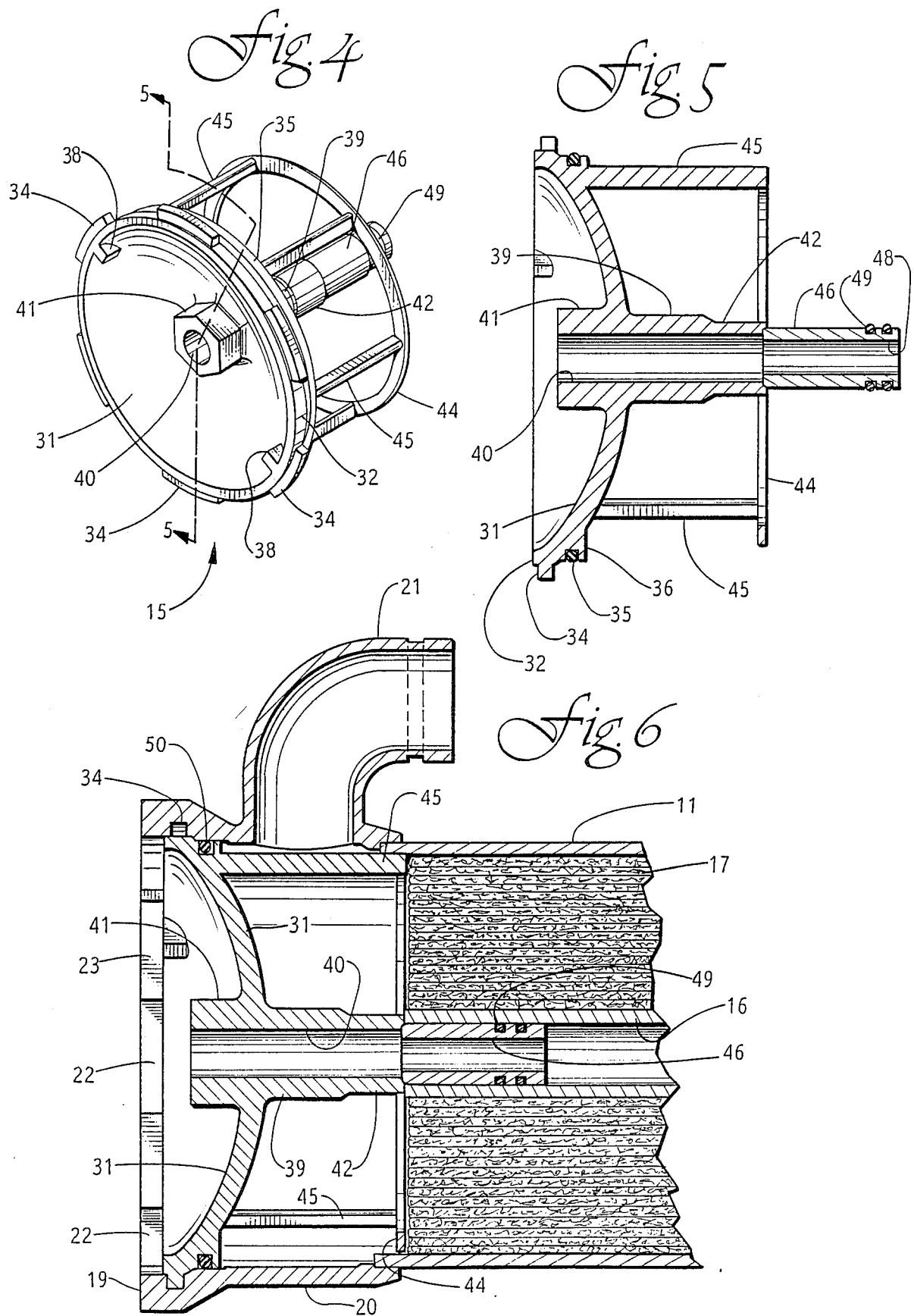

CROSS FLOW FILTRATION APPARATUS AND CLOSURE ASSEMBLY THEREFOR

BACKGROUND OF THE INVENTION

The present invention relates to an improved cross flow filtration apparatus of the type having an elongated filtration element housing and a cross flow filtration element disposed therein, and more particularly to an improved closure for such an apparatus. Generally, "cross flow" filtration technology, as opposed to "dead end" filtration technology, the feed water, in addition to having a portion pass through the filter medium, continually flows across the membrane or filter medium surface and exits through an outlet port at the opposite end of the apparatus. In contrast, with "dead end" filtration technology, there is no flow of feed suspension and/or solution relative to the filter media other than what passes through it.

Conventional cross flow filtration apparatus such as, but not limited to, reverse osmosis and ultrafiltration apparatus, includes a generally cylindrical housing, a cross flow filtration member disposed within such housing and means for closing off the ends of such housing. Various access openings are also provided so that feed solution can be supplied to the filtration element under pressure and concentrate and permeate can be withdrawn from the unit. Normally, the filtration element comprises a membrane member which is spirally wound around a central permeate tube.

In the prior art, the tendency in the art is to utilize fiberglass housings and to provide each end with a plug type fitting which is retained in sealing relationship relative to the housing by an 0-ring seal and a conventional retaining ring. Some of these retaining rings are conventional spiral or snap rings while others consist of segmented rings which are assembled in pieces and retained by screws or other threaded members. In apparatus having fiberglass housings, the various inlet and outlet ports are provided in the end plug itself. Additionally, some such apparatus includes a separate filter element support member positioned between a portion of the plug and the filtration element end to prevent the element from undesirable telescoping or axial movement.

Although many of the prior art cross flow filtration housings are constructed of fiberglass, some are constructed of stainless steel or other metal. While the filtration housings constructed of metal provide the capability of providing an inlet/outlet port positioned in a sidewall of the housing near one end, the filtration apparatus comprising metal housings continue to include end closures comprising a plug member retained in the end via a seal member and a conventional snap ring arrangement.

Current cross flow filtration apparatus and their closure mechanisms give rise to various problems and limitations. First, because of the relatively high pressures developed within the housing, the snap rings for retaining the end cap must be quite strong. To obtain the necessary strength, these are commonly constructed of a steel which tends to rust and oxidize. Although stainless steel rings are available, they generally have a much lower pressure rating. Secondly, each prior art closure mechanism consists of many parts, particularly if segmented retaining rings are utilized. Thus, because the closure apparatus must be removable to replace expended filter elements which have a much shorter useful life than the housing itself, the multiplicity of parts increases the replacement time. Thirdly, in filtration apparatus utilizing fiberglass housings, in which all of the inlet and outlet ports are provided within the end plug, it is necessary to remove or take off the high pressure pipe whenever the membrane elements are replaced. Fourthly, because it is sometimes difficult to determine whether the snap ring is properly seated, there is some danger that the closure could fail during operation of the apparatus. Accordingly, there is a need for a cross flow filtration apparatus with a closure assembly which solves these and other problems in the art.

SUMMARY OF THE INVENTION

In contrast to the prior art, the present invention provides a cross flow filtration apparatus having an improved closure assembly which substantially reduces the number of closure parts by eliminating the use of any snap or retaining rings, which is easier and simpler to operate and therefore safer, and which improves corrosion resistance.

More specifically, the cross flow filtration apparatus of the present invention includes an elongated filtration element housing, a cross flow filtration element disposed within the housing and an improved closure assembly connected with at least one end of the apparatus housing.

The closure assembly includes a generally annular adaptor with one end connected to the apparatus housing and a second end provided with a first connection means. The adaptor is also provided with a generally annular side wall extending between its ends and an inlet/outlet port in such side wall. The closure assembly also includes an end cap which is adapted for sealing cooperation with the adaptor and which includes an end wall having an outer peripheral edge provided with a second connection means. The end wall is also provided with a permeate access port for connection with the permeate tube of the filtration element.

The first and second connection means of the adaptor and end cap, respectively, cooperate with one another to secure the end cap to the adaptor with a minimum of parts and a minimum of effort. One of the connection means includes a plurality of protruding lugs and the other includes a plurality of corresponding recessed portions positioned to receive the lugs upon selective rotation of the end cap relative to the adaptor. A seal member is positioned between a portion of the end cap and a portion of the adaptor to form a seal therebetween when the end cap is secured to the adaptor.

A further feature of the present invention is the provision of a membrane element support cage integrally formed with the end cap to limit or prevent the tendency of the membrane or filtration element from telescoping during operation.

Accordingly, it is an object of the present invention to provide, in combination, a cross flow filtration apparatus having an improved closure assembly.

Another object of the present invention is to provide a closure assembly for a cross flow filtration apparatus having a minimum number of components, requiring a minimum amount of time to assemble and disassemble, and providing for improved safety by causing incorrect assembly to be less likely to occur.

Another object of the present invention is to provide a cross flow filtration apparatus having a side entry inlet/outlet port and an improved closure assembly.

A still further object of the present invention is to provide a cross flow filtration apparatus with an improved closure assembly and an integral filter element support cage.

These and other objects of the present invention will become apparent with reference to the drawings, the description of the preferred embodiment and the appended claims.

DESCRIPTION OF THE DRAWINGS

FIG. 1 is an exploded, pictorial view of the cross flow filtration apparatus of the present invention.

FIG. 2 is a pictorial view of the closure assembly adaptor for use in the filtration apparatus of the present invention.

FIG. 3 is a cross sectional view of the adaptor illustrated in FIG. 2.

FIG. 4 is a pictorial view of the closure assembly end cap for use with the filtration apparatus of the present invention.

FIG. 5 is a cross sectional view of the end cap illustrated in FIG. 4.

FIG. 6 is a cross sectional view showing the relationship between the filtration apparatus housing, the adaptor and the end cap in assembled form.

DESCRIPTION OF THE PREFERRED EMBODIMENT

Reference is first made to FIG. 1 showing a pictorial, exploded view of the cross flow filtration apparatus of the present invention. As illustrated, the filtration apparatus 10 of the present invention includes a tubular filtration member housing 11, a cross flow filtration element 12 disposed within the housing 11, an adaptor 14 connected to each end of the housing 11 and an end cap 15 associated with each of the adaptors 14. In the preferred embodiment, each adaptor 14 and end cap 15 pair forms a closure assembly for the housing 11.

More specifically, the housing 11 comprises an elongated tubular member which, in the preferred embodiment, is constructed of stainless steel. It is possible, however, for the housing 11 to be constructed of other materials provided the adaptor members 14 can be operatively connected to it. It is also contemplated that the housing 11 could have various shapes; however, it is highly conventional for the housing 11 to have a generally cylindrical configuration.

The filtration element 12 is intended to be a typical cross flow filtration element of the type which is conventional in the art, such as, but limited to, a filtration membrane. More specifically, in the preferred embodiment, the element 12 includes a centrally positioned permeate or filtrate tube 16 and at least one sheet of a membrane 17 with appropriate spacer and backing material which is spirally wound around the permeate or filtrate tube in a conventional manner known in the art. Typical cross flow membrane elements include, among possible others, reverse osmosis and ultrafiltration elements.

Reference is next made to FIGS. 2 and 3 illustrating the detailed features of the closure assembly adaptor 14. As illustrated, the adaptor 14 includes a first end 18 connected with an end of the housing 11 (FIG. 1) and a second end 19 provided with first connection means. As illustrated best in FIG. 2, the first connection means includes a plurality of recessed portions positioned circumferentially around the inner radial edge of the end 19. Each of the recessed portions includes a first recessed section 22 having an arcuate surface of constant radius of curvature which extends generally parallel to the longitudinal axis of the adaptor 14. Each of the recessed portions also includes a second recessed section 24 position below the edge portions 23 and adjacent to its corresponding first recessed section. Each of these second recessed sections 24 is defined by an inner surface of the edge portions 23 and an outer edge surface 30 of the adaptor 14. Each of the second recessed sections 24 is further provided with a stop member 25 and is in communication with a corresponding first recessed section 22.

The adaptor 14 also includes a generally annular side wall 20 extending between the ends 18 and 19. An inlet/outlet port in the form of an elbow member 21 is provided in the side wall 20. In the preferred embodiment, the elbow 21 is investment cast or otherwise connected with an opening in the side wall 20.

A pair of assembly tabs 29 are provided on the outside surface of the portion of the adaptor near the end 19. Only one of such tabs 29, however, is illustrated in FIG. 2. When used in connection with an appropriate tool, these tabs 29 are utilized to assist in inserting the end cap into the adaptor 14. A boss 28 is also shown as extending outwardly from the side wall 20. This is a boss adapted for connection by various mounting brackets and does not involve the internal functioning of the filtration apparatus.

Reference is next made to FIGS. 4 and 5 illustrating the detailed configuration of the end cap 15. As shown, the end cap 15 includes a generally inverted dome shaped end wall 31 having an outer peripheral edge 32. The peripheral edge 32 is provided with connection means in the form of a plurality of connection lugs 34 designed for cooperative engagement with the connection means of the adaptor 14 (FIGS. 2 and 3). Located centrally in the end wall 31 is a permeate access port 40 designed to provide access to the permeate tube 16 of the filter element 12 (FIG. 1). The port 40 is defined in part by a tube member having a plurality of tubular sections 39, 42 and 46 extending inwardly from the end wall 31. The portion of the port 40 on the outward side of the wall 31 is defined by an outward extension which is provided with an external hexagonal configuration 41. The hexagonal configuration permits the end cap to be rotated with an appropriate tool. The portion of the port 40 extending outwardly from the wall 31 is also preferably provided with a plurality of interior threads or other conventional connection means for connecting the port 40 to an external permeate conduit. As illustrated in FIG. 5, the end wall 31 and the tubular sections 41, 39 and 42 are integral with one another. The structure of the preferred embodiment is manufactured by casting the entire end cap via an investment method of casting.

Although the tubular section 46 can also be molded directly with the tubular sections 39 and 42, the preferred embodiment contemplates that the inwardly extending tubular section 46 be manufactured separately and welded or otherwise connected with the inner end of the tubular section 42 via some other conventional method. This allows for the end cap 15 to be customized for a particular filter member, with a particular size permeate tube. As shown best in FIGS. 4 and 5, the innermost end of the tubular section 46 includes a pair of grooves 48 which are provided with a pair of O-rings 49. When inserted into the end of the permeate tube 16 (FIG. 1) the O-rings 49 form a seal between the inner surface of such tube 16 and the outer surface of the section 46.

It is contemplated that the end wall 31 could have a variety of different configurations, in the preferred embodiment; however, the wall 31 has a concave or inverted dome configuration. This particular configuration not only provides the end wall 31 with improved strength, but also allows the hexagonal member 41 to be recessed below the top portion of the outer peripheral edge 32, thus minimizing the overall length of the filtration apparatus. Although the end wall 31 could be flat, this would require the end wall to have increased thickness to provide for the necessary strength. In such a configuration, the hexagonal portion 41 would extend outwardly from the top portion of the outer peripheral edge 32, thereby increasing the overall length of the filtration apparatus. Similarly, the wall 31 could also be convex or have an outwardly extending dome shape. While this configuration would increase the structural strength of the wall, and thereby permit the wall thickness to be reduced, such a configuration would significantly increase the overall length of the filtration apparatus. The preferred configuration is the configuration illustrated which is a concave or inverted dome configuration which not only provides for increased structural strength in the wall 31, but also allows for the portion 41 to be recessed.

The outer peripheral edge 32 includes a plurality of arcuately shaped connection lugs 34. Each of these lugs 34 is integrally formed with an outer annular surface of the peripheral edge 32 and extend outwardly therefrom in a common plane generally perpendicular to the longitudinal axis of the end cap 15. As will be described in greater detail below, the connection lugs 34 are designed to cooperate with the recessed portions in the adaptor 14 to selectively secure the end cap 15 to the adaptor 14 as a result of relative rotation of the end cap 15 relative to the adaptor 14.

In the preferred embodiment, the end cap 15 is shown as being provided with a plurality of lugs 34 and the adaptor 14 being provided with a plurality of recessed portions 22 and 24; however, it is contemplated that the end cap 15 could be provided with, or considered as having, a plurality of recessed portions and the adaptor 14 provided with, or considered as having, a plurality of inwardly extending connection lugs.

In the preferred embodiment, the end cap 31 is also provided with a pair of pulling tabs 38. These tabs 38 are integrally formed with an outer surface of the wall 31 and are utilized to assist in removing the end cap from the housing.

As illustrated best in FIG. 5, the end cap 15 is also provided with a seal member groove or seat 35. This groove 35 is positioned below or to the inner side of the lugs 34 and is adapted to receive an O-ring or other seal member. When the adaptor 14 and end cap 15 are fully assembled as illustrated in FIG. 6 and as will be described in greater detail below, the O-ring 50 forms a seal between the end cap 15 and the seal surface or seat 26 (FIG. 3) of the adaptor 14. Although the preferred embodiment shows the end cap 15 provided with the O-ring groove 35, it is contemplated that the adaptor 14 could instead be provided with the O-ring groove and the end cap simply being provided with a seal surface adapted for engagement with the O-ring.

A generally flat or annular surface 36 is provided immediately below, or on the inner side of, the O-ring groove 35. This surface 36 provides a connecting surface and support for the filter member support cage comprised of a plurality of support legs 45 and a lower support ring 44. As shown best in FIG. 5, the upper or outer ends of each of the support legs 45 are integrally connected with the surface 36, while each of the lower or inner ends of each of the legs 45 are integrally connected with the support ring 44. In the preferred embodiment, the lower end of the support ring 44 is flush with the lower or inner end of the tubular section 42. Although it is contemplated that the length of the legs 45 can vary, they must be long enough to accommodate the side port 21 in the adaptor 14. In other words, the side port 14, when the adaptor 14 and end cap are fully assembled, must be positioned between the end wall 31 of the end cap 15 and the support ring 44.

Reference is next made to FIGS. 1 and 6 showing the housing 11, the adaptor 14 and the end cap 15 in their assembled form. As shown, an adaptor 14 is connected with each end of the housing 11 by appropriate connection means. If both the adaptor 14 and the housing 11 are constructed of weldable metal, the connection can be via welding. It is contemplated, however, that other conventional connection means can also be provided. The housing 11 is provided with a filter element 12 having a centrally positioned permeate tube 16.

To insert and connect the end cap 15, the end cap 15 is inserted into the open end of the assembly so that the innermost tubular portion 46 is inserted into the end of the permeate tube 16. As a result of this insertion, the O-ring members 49 on the outside surface of the tubular section 46 form a seal between the inner surface of the permeate tube 16 and the outer surface of the section 46. To connect the end cap 15 with the adaptor 14, the plurality of lugs 34 on the end cap 15 are aligned with the recessed sections 22. When the end cap 15 has been fully inserted, it is rotated in a clockwise direction. As a result of this limited rotation, the lugs are rotated into the recessed sections 24 and retained therein as a result of engagement with the portions 23. Rotational movement of the cap 15 relative to the adaptor 14 is limited via the stop members 25. In the preferred embodiment, the end cap is rotated by applying an appropriate tool or wrench to the hexagonal member 41 to obtain the necessary leverage. When fully assembled, the support ring 44 engages an edge portion of the filter member 12 to prevent the filter member from telescoping due to operating pressure.

When it is desired for the end cap 15 to be removed to service the filtration apparatus or to remove or replace the filtration element 12, the above procedure is reversed. First, the end cap 15 is rotated counterclockwise so that the lugs 34 are aligned with the recessed sections 22. The end cap 15 is then pulled out from the filtration apparatus. Because this is often difficult, a pair of pulling lugs or tabs 38 are provided on the end wall 31 to assist in this task.

Although the description of the preferred embodiment has been quite specific, it is contemplated that various modifications could be made without deviating from the spirit of the present invention. Accordingly, it is intended that the scope of the present invention be dictated by the appended claims, rather than by the description of the preferred embodiment.

I claim:

1. A cross flow filtration apparatus comprising, in combination:
   an elongated filtration element housing having first and second ends;
   a cross flow filtration element disposed within said filtration element housing, said filtration element comprising a cross flow filtration medium and a central filtrate tube; and
   a closure assembly connected with at least one of said first and second ends of said filtration element housing, said closure assembly including:
   a generally annular adaptor having a first end connected with said one end of said housing, a second end provided with first connection means, a generally annular side wall connecting said first and second ends of said adaptor and an inlet/outlet port provided in said side wall;
   an end cap for sealing cooperation with said adaptor, said end cap including an end wall having an outer peripheral edge provided with second connection means and a filtrate access port centrally positioned in said end wall for providing sealed access to said filtrate tube;
   said first and second connection means cooperating with one another to selectively secure said end cap to said adaptor, one of said first and second connection means having a plurality of protruding lugs and the other of said first and second connection means having a plurality of recessed portions positioned to receive said lugs upon selective limited rotation of said end cap relative to said adaptor to thereby secure said end cap to said adaptor; and
   a seal member disposed between a portion of said end cap and a portion of said adaptor to form a seal therebetween when said end cap is secured to said adaptor.

2. The filtration apparatus of claim 1 wherein one of said end cap and said adaptor is provided with a seal member groove to receive said seal member and the other of said end cap and said adaptor is provided with a seal surface.

3. The filtration apparatus of claim 2 wherein said end cap is provided with a seal member groove.

4. The filtration apparatus of claim 1 wherein said filtrate access port is defined by a tubular member integrally and rigidly formed within said end wall.

5. The filtration apparatus of claim 4 wherein a portion of said tubular member extends outwardly from said end wall and is provided with a hexagonal exterior configuration.

6. The filtration apparatus of claim 1 wherein said end wall of said end cap has a generally concave configuration.

7. The filtration apparatus of claim 6 wherein said filtrate access port is defined by a tubular member integrally and rigidly formed within said end wall.

8. The filtration apparatus of claim 7 wherein a portion of said tubular member extends outwardly from said end wall and is provided with a hexagonal exterior configuration.

9. The filtration apparatus of claim 8 wherein said portion of said tubular member extending outwardly from said end wall does not extend beyond the outermost surface of said peripheral edge of said end cap.

10. The filtration apparatus of claim 1 including a filtration element support cage comprising a support ring and a plurality of support legs engaging a portion of said end cap.

11. The filtration apparatus of claim 10 wherein said support cage is integrally and rigidly formed with said end cap.

12. The filtration apparatus of claim 1 wherein said first connection means includes a plurality of recessed portions and said second connection means includes a plurality of protruding lugs.

13. The filtration apparatus of claim 12 wherein each of said plurality of recessed portions includes a first recessed section longitudinally alignable with and adapted to longitudinally receive a corresponding one of said plurality of protruding lugs and a second recessed section adjacent to said first recessed section and adapted to receive said protruding lugs as a result of said selected limited rotation of said end cap relative to said adaptor.

14. The filtration apparatus of claim 13 wherein each of said second recessed sections is provided with a stop member to limit the rotational movement of said end cap.

15. The filtration apparatus of claim 1 wherein said inlet/outlet port is provided with an elbow.

16. The filtration apparatus of claim 1 wherein said tubular member includes a seal member for sealing engagement with the inner surface of said filtrate tube.

17. A closure assembly for a cross flow filtration apparatus of the type having an elongated filtration element housing and a cross flow filtration element disposed therein having a cross flow filtration medium and a central filtrate tube, said assembly connected with at least one end of said housing and comprising:
   a generally annular adaptor having a first end connected with said one end of said housing, a second end provided with first connection means, a generally annular side wall connecting said first and second ends of said adaptor and an inlet/outlet port provided in said side wall;
   an end cap for sealing cooperation with said adaptor, said end cap including an end wall having an outer peripheral edge provided with second connection means and a filtrate access port centrally positioned in said end wall for providing sealed access to said filtrate tube;
   said first and second connection means cooperating with one another to selectively secure said end cap to said adaptor, one of said first and second connection means having a plurality of protruding lugs and the other of said first and second connection means having a plurality of recessed portions positioned to receive said lugs upon selective limited rotation of said end cap relative to said adaptor to thereby secure said end cap to said adaptor; and
   a seal member disposed between a portion of said end cap and a portion of said adaptor to form a seal therebetween when said end cap is secured to said adaptor.

* * * * *